United States Patent
Beck

(10) Patent No.: US 10,556,374 B2
(45) Date of Patent: Feb. 11, 2020

(54) METHOD FOR CONVERTING A DESIGN OF AN ORIGINAL PREFORM AND A RELATED MOLD STACK FOR THE MOLDING THEREOF

(71) Applicant: Husky Injection Molding Systems Ltd., Bolton (CA)

(72) Inventor: Christophe Simon Pierre Beck, Terville (FR)

(73) Assignee: Husky Injection Molding Systems Ltd., Bolton, ON (CA)

( * ) Notice: Subject to any disclaimer, the term of this patent is extended or adjusted under 35 U.S.C. 154(b) by 210 days.

(21) Appl. No.: 15/527,485

(22) PCT Filed: Nov. 4, 2015

(86) PCT No.: PCT/CA2015/051132
§ 371 (c)(1),
(2) Date: May 17, 2017

(87) PCT Pub. No.: WO2016/095020
PCT Pub. Date: Jun. 23, 2016

(65) Prior Publication Data
US 2017/0334125 A1    Nov. 23, 2017

Related U.S. Application Data

(60) Provisional application No. 62/091,813, filed on Dec. 15, 2014.

(51) Int. Cl.
*B29B 11/14* (2006.01)
*B29C 49/30* (2006.01)
(Continued)

(52) U.S. Cl.
CPC .......... *B29C 49/4242* (2013.01); *B29B 11/08* (2013.01); *B29B 11/14* (2013.01);
(Continued)

(58) Field of Classification Search
CPC . B29C 49/4242; B29C 49/30; B29C 49/4289; B29C 45/2708; B29C 45/2711;
(Continued)

(56) References Cited

U.S. PATENT DOCUMENTS

| 7,645,132 B2 | 1/2010 | McCready | |
| 9,358,710 B2 * | 6/2016 | Witz | B29C 45/0055 |
| 2013/0244050 A1 * | 9/2013 | Witz | B29C 45/0055 |
| | | | 428/542.8 |

OTHER PUBLICATIONS

International Search Report; Zhu, Julia; Dec. 8, 2015; 3 pages.

* cited by examiner

*Primary Examiner* — David P Bryant
*Assistant Examiner* — Lawrence Averick

(57) ABSTRACT

Disclosed herein, amongst other things, is a method for converting a design of an original preform that is blow moldable to form a container into a converted preform having less molding material that is blow moldable to form the same container. The method includes retaining a neck finish and body of the original preform on the converted preform. The method further includes replacing the original base of the original preform with a converted base having an outer base surface that joins with an outer body surface of the body at an base split-line of the original base and that fits offset within an outer body surface of the original base, whereby the converted preform has a reduced total length, disregarding any gate vestige that may be formed thereon, relative to a total length of the original preform.

8 Claims, 5 Drawing Sheets

(51) Int. Cl.
*B29L 31/00* (2006.01)
*B29C 45/17* (2006.01)
*B29C 49/42* (2006.01)
*B29B 11/08* (2006.01)
*B29C 45/27* (2006.01)
*B29C 45/26* (2006.01)

(52) U.S. Cl.
CPC ...... *B29C 45/2708* (2013.01); *B29C 45/2711* (2013.01); *B29C 49/30* (2013.01); *B29C 49/4289* (2013.01); *B29B 2911/14486* (2013.01); *B29B 2911/14493* (2013.01); *B29C 45/2673* (2013.01); *B29L 2031/7158* (2013.01)

(58) Field of Classification Search
CPC . B29C 45/2673; B29C 49/08; B29C 45/2703; B29C 45/1756; B29C 45/26; B29B 11/14; B29B 11/08; B29B 2911/14493; B29B 2911/14486; B29L 2031/7158
See application file for complete search history.

METHOD FOR CONVERTING A DESIGN OF AN ORIGINAL PREFORM AND A RELATED MOLD STACK FOR THE MOLDING THEREOF

TECHNICAL FIELD

Embodiments of the present invention generally relate to a method for converting a design of an original preform that is blow moldable to form a container to remove molding material therefrom and a related method for converting a mold stack for the molding thereof.

BACKGROUND

It is known to blow mold containers such as, for example, beverage bottles from preforms. Preforms may be produced by various molding technologies and processes such as, for example, injection or compression molding.

One such prior art preform is depicted with reference to FIG. 1. In particular, there is depicted an original preform 100 that is blow moldable to form a container (not shown). The original preform 100 has a hollow tubular body that includes a neck finish 102 at an open end thereof, an original base 106 at a closed end thereof and a body 104 arranged between the neck finish 102 and the original base 106. The neck finish 102 is configured to retain, in use, a closure (not shown) thereon, and the body 104 and the original base 106 are blow moldable to form corresponding parts of the container.

The original preform 100 may be molded in a mold stack of an injection mold (not shown) such as, for example, the mold stack 520 shown in FIG. 5. The mold stack 520 has various stack components including a core assembly 522 (i.e. core insert 524 and lock ring 523), neck rings 526, a cavity insert 528 and a gate insert 530 that are configured to cooperate together to define a molding cavity 532. In use, molding material is injected into the molding cavity 532; via a gate passage that is defined in the gate insert 530, to form the original preform 100 therein. The interface between mating stack components of the mold stack 520 defines a "split line". Two of the more prominent split lines are identified in FIGS. 1 and 5 as including a base split line S1 and a neck split line S2. As its name implies, the base split line S1 defines a transition between the body 104 and the original base 106 of the original preform 100, the foregoing being defined at the interface between the cavity insert 528 and the gate insert 530. Likewise, the neck split line S2 defines a transition between the body 104 and the neck finish 102 of the original preform 100, the foregoing being defined between the cavity insert 528 and the neck rings 526.

To reduce an amount of molding material in the preform, and thus the container blow molded therefrom, it is known to remove molding material from a base of the preform with a reshaping thereof. An example of the foregoing may be appreciated with reference to FIG. 2. In this example the original base 106 of the original preform 100 is replaced by a lighter weight base 206. In particular, an outer base surface 207 of the lighter weight base 206 replaces a hemispherical outer base surface of the original base 106. The outer base surface 207 of the converted base includes compound surfaces 207A, 207B, 207C of different curvature that fit within the original outer body surface 107. The outer base surface 207 is furthermore defined to join with an outer body surface 103 (FIG. 1) of the body 104 at the base split-line S1 of the original base 106 and to intersect with a longitudinal axis X of the original preform 100 at a common point NI to the original outer body surface 107 (disregarding any gate vestige 108, 208). In so doing molding material is taken away from a wall of the base in a central part of the base without changing a total length TL (FIG. 1) of the preform 100, 200.

SUMMARY

In accordance with an aspect disclosed herein, there is provided a method for converting a design of an original preform that is blow moldable to form a container into a converted preform having less molding material that is blow moldable to form the same container. The original preform has a hollow tubular body that includes a neck finish at an open end thereof, an original base at a closed end thereof and a body arranged between the neck finish and the original base, wherein the neck finish is configured to retain, in use, a closure thereon, and the body and the original base are blow moldable to form corresponding parts of the container. The method includes retaining the neck finish and body of the original preform on the converted preform. The method further includes replacing the original base of the original preform with a converted base having an outer base surface that joins with an outer body surface of the body at an base split-line of the original base and that fits offset (i.e. displaced) within an outer body surface of the original base, whereby the converted preform has a reduced total length, disregarding any gate vestige that may be formed thereon, relative to a total length of the original preform.

In accordance with an aspect disclosed herein, there is provided a further method for converting a mold stack for molding an original preform that is blow moldable to form a container into a converted mold stack for molding a converted preform having less molding material that is blow moldable to form the same container. The mold stack includes a core assembly, neck rings, a cavity insert and a gate insert that are configured to cooperate together to define a molding cavity for molding the original preform. The original preform has a hollow tubular body that includes a neck finish at an open end thereof, an original base at a closed end thereof and a body arranged between the neck finish and the original base, wherein the neck finish is configured to retain, in use, a closure thereon, and the body and the original base are blow moldable to form corresponding parts of the container. The method includes retaining the core assembly, at least in part, the neck rings and the cavity insert that together define the same neck finish and body of the original preform on the converted preform. The method further includes replacing the gate insert of the mold stack with a conversion gate insert to define a converted base on the converted preform having an outer base surface that joins with an outer body surface of the body at an base split-line of the original base and that fits offset within an outer body surface of the original base, whereby the converted preform has a reduced total length, disregarding any gate vestige that may be formed thereon, relative to a total length of the original preform.

These and other aspects and features of non-limiting embodiments will now become apparent to those skilled in the art upon review of the following description of specific non-limiting embodiments in conjunction with the accompanying drawings.

DESCRIPTION OF THE DRAWINGS

The non-limiting embodiments will be more fully appreciated by reference to the accompanying drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Reference will now be made in detail to various non-limiting embodiment(s) of a method for converting a design of an original preform into a converted preform and a related method for converting a mold stack for the molding thereof. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Figure 1:
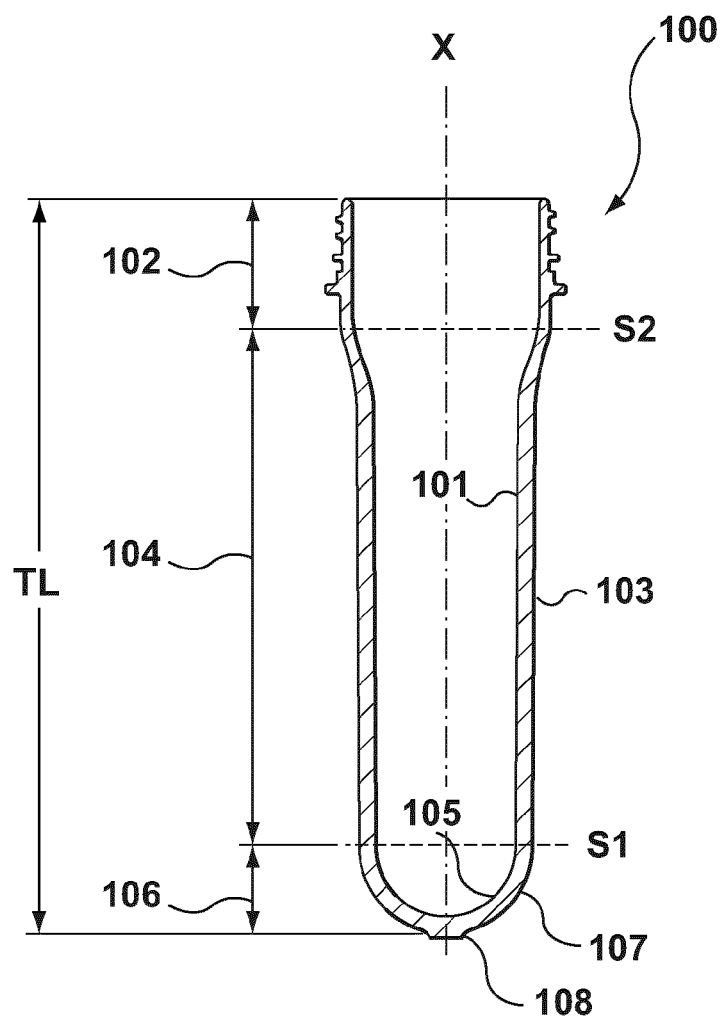
FIG. 1 depicts a cross-sectional view of an original preform in accordance with the prior art.
Figure 2:
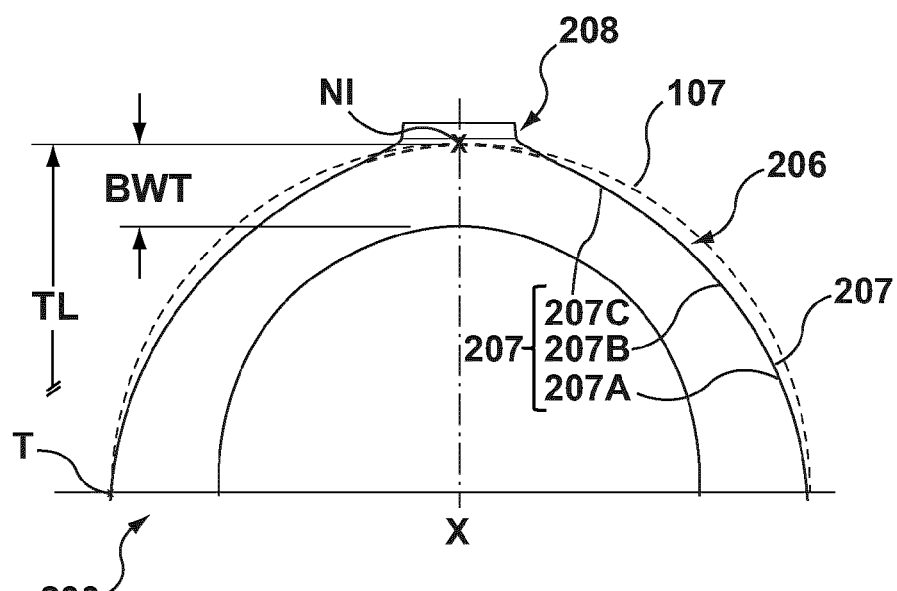
FIG. 2 depicts a cross-sectional view of an original base of the preform of FIG. 1 and a known prior art variant thereto.
Figure 3:
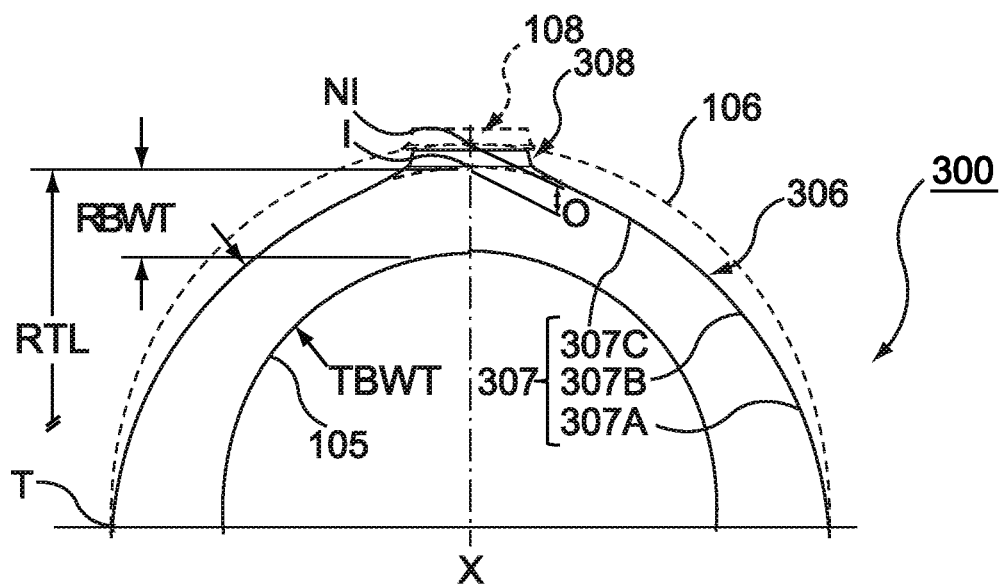
FIG. 3 depicts a cross-sectional view of a converted base of a converted preform in accordance with a non-limiting embodiment that was defined in accordance with a method disclosed herein.
Figure 4:
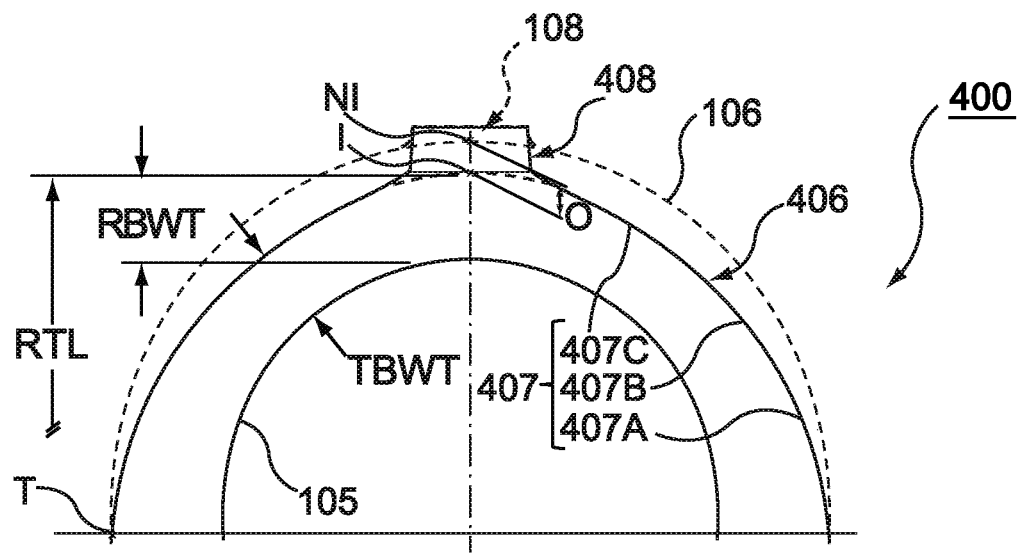
FIG. 4 depicts a cross-sectional view of a converted base of a converted preform in accordance with another non-limiting embodiment that was defined in accordance with the method disclosed herein.
Figure 5:
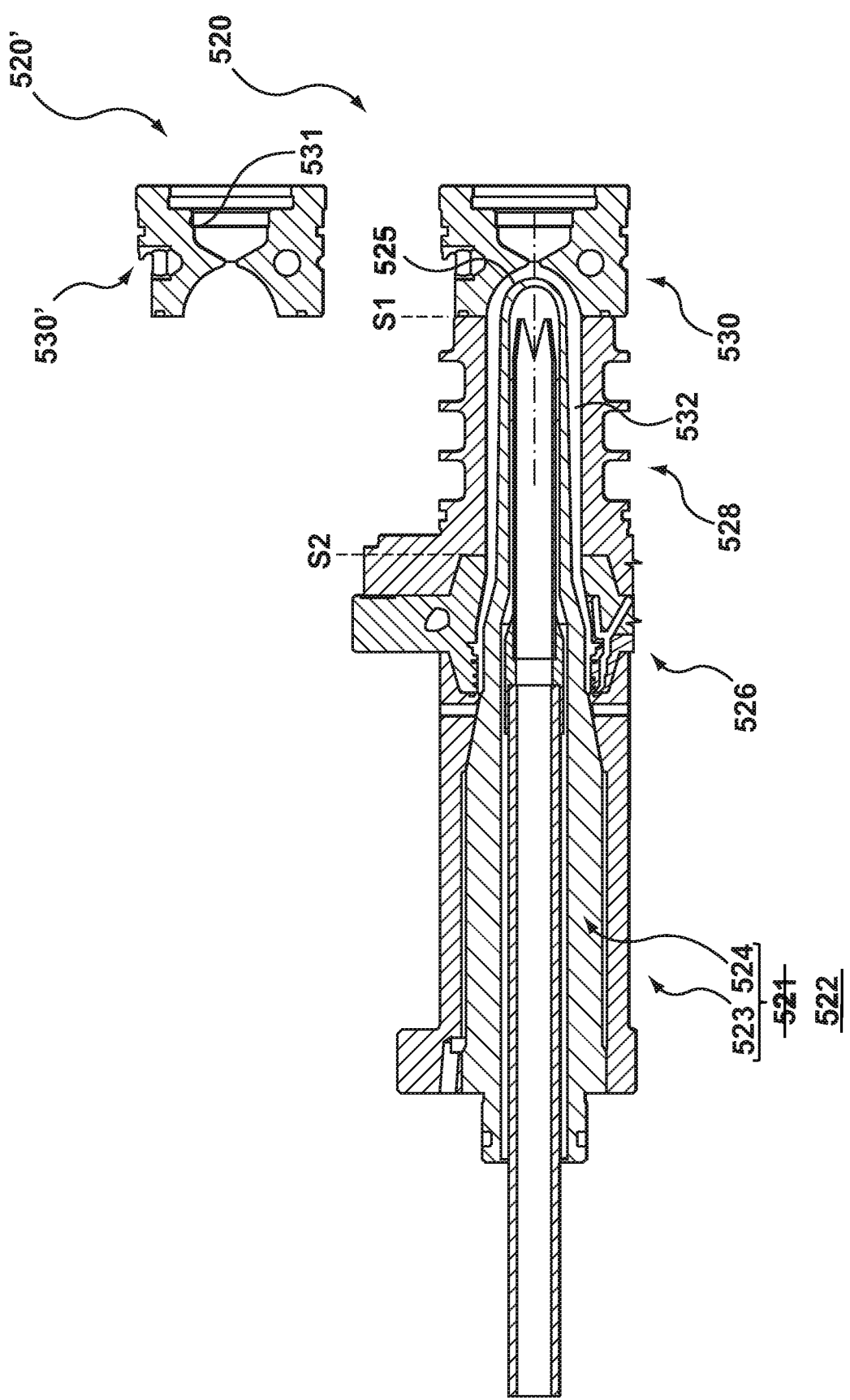
FIG. 5 depicts a cross-sectional view of a mold stack in accordance with a non-limiting embodiment that is configured for molding the original preform of FIG. 1 along with conversion gate insert for converting the mold stack to mold the converted preform having the converted base of FIG. 3.
Figure 6:
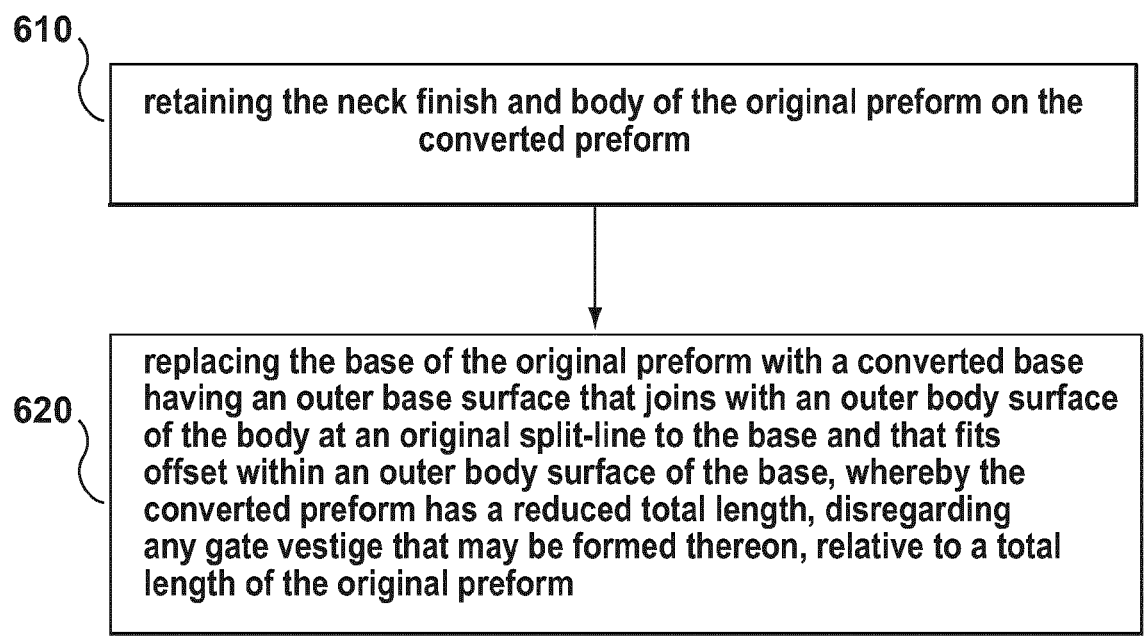
FIG. 6 depicts a flow chart of the method for converting an original preform to a converted preform such as, for example, the conversion of the original preform of FIG. 1 to include the converted base of FIG. 3.

With reference to FIGS. 3, 4 and 5 it may be appreciated that a new approach has been defined for reducing the amount of molding material in the base of a preform. In particular, a method 600 is defined for converting a design of an original preform 100 that is blow moldable to form a container (not shown) into a converted preform 300, 400 having less molding material that is blow moldable to form the same container. The method includes retaining (operation 610) the neck finish 102 and a body 104 of the original preform 100 on the converted preform 300, 400. The method further includes replacing (operation 620) the original base 106 of the original preform 100 with a converted base 306, 406 having an outer base surface 307, 407 that joins with an outer body surface 103 of the body 104 at the base split-line S1 of the original base 106 and that fits offset within an original outer body surface 107 of the original base 106, whereby the converted preform 300, 400 has a reduced total length RTL, disregarding any gate vestige 308, 408 that may be formed thereon, relative to a total length TL of the original preform 100. It does not matter if the outer base surface 307, 407 joins to the outer body surface 103 at an intersection or if they are tangent.

In so doing the outer base surface 307, 407, disregarding any gate vestige 308, 408 that may be formed thereon, may be defined to intersect with a longitudinal axis X of the converted preform 300, 400 at a point I that is offset by a distance O from a further point NI where the original base 106, disregarding any gate vestige 108 that may be formed thereon, intersects the longitudinal axis X of the original preform 100. The distance O of the offset may, for example, be selected to be within the range about 0.05 to 0.25 mm without significantly changing affecting the blow molding of the container base (not shown).

The method 600 may further include maintaining an inner base surface 105 thereof on the converted base 306, 406 that joins with an inner body surface 101 of the body 104, whereby the converted base 306, 406 has a reduced bottom wall thickness RBWT relative to a bottom wall thickness BWT of the original base 106.

That being said, in an alternative embodiment, not shown, the inner base surface may also be redefined to vary the amount and/or distribution of molding material in the converted base.

The operation of replacing the original base 106 may further include one or more other known methods to reduce the amount of molding material in the converted base 306, 406. For example, the replacing the original base 106 may include replacing a typical hemispherical outer surface 107 of the original base 106 by defining the outer base surface 307, 407 of the converted base 306, 406 to include compound surfaces 307A, 307B, 307C, 407A, 407B, 407C of different curvature. The foregoing may be selected to define a shape that is generally an elliptic paraboloid. The compound surfaces 307A, 307B, 307C, 407A, 407B, 407C may be furthermore selected to define a thinnest bottom wall thickness TBWT along a central region thereof.

Figure 7:
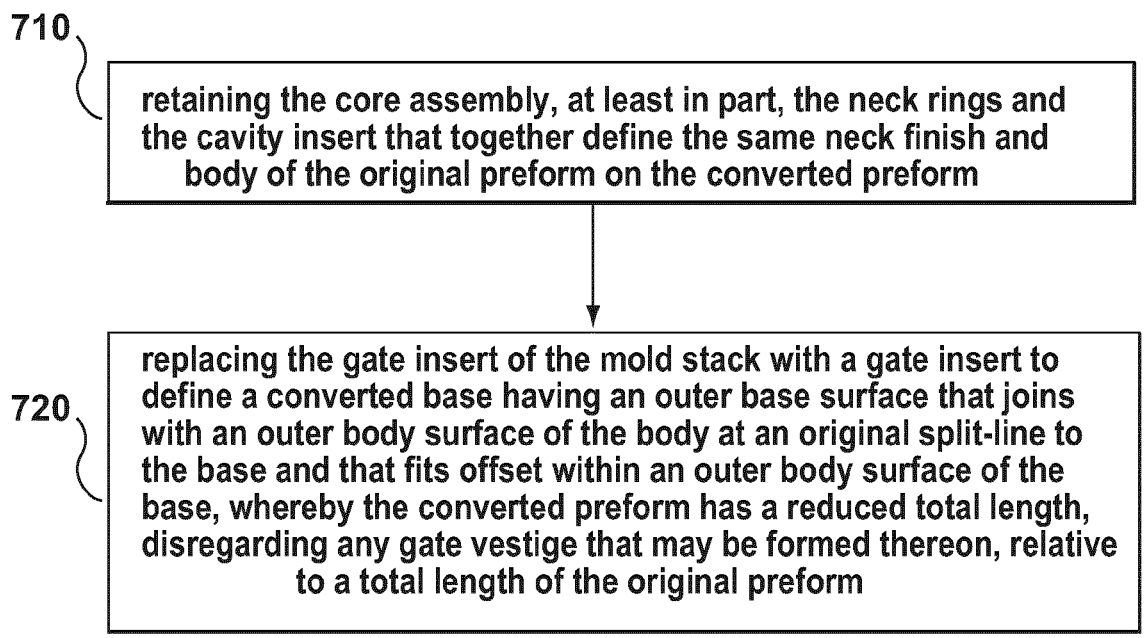
FIG. 7 depicts a flow chart of a further method for converting a mold stack for molding an original preform to mold a converted preform such as, for example, the conversion of the mold stack of FIG. 4 for molding the original preform of FIG. 1 to include the converted base of FIG. 3.

With reference to FIGS. 5 and 7 the foregoing may be further appreciated within the context of a method 700 for converting the mold stack 520 for molding the original preform 100 into a converted mold stack 520' for molding the converted preform 300, 400. The method 700 includes retaining (operation 710) the core assembly 521, at least in part, the neck rings 526 and the cavity insert 528 that together define the same neck finish 102 and body 104 of the original preform 100 on the converted preform 300, 400. The method 700 also includes replacing (operation 720) the gate insert 530 of the mold stack 520 with a conversion gate insert 530' to define the converted base 306, 406 on the converted preform 300, 400 having the outer base surface 307, 407 that joins with the outer body surface 103 of the body 104 at the base split-line S1 of the original base 106 and that fits offset within an original outer body surface 107 of the original base 106. In so doing the converted preform 300, 400 has a reduced total length RTL, disregarding any gate vestige 308, 408 that may be formed thereon, relative to a total length TL of the original preform 100.

The conversion gate insert 530' may be configured to define a gate vestige 308 (FIG. 3) that has the same length as the gate vestige 108 of the original base 106. The foregoing would ensure downstream compatibility of the converted preform 300 and a base that is provided in a blow mold (not shown) of a blow molding machine (not shown).

However, to accommodate the foregoing without modifying a length of the gate insert would require repositioning of a nozzle interface 531 that is defined therein and possibly modification of a nozzle (not shown) of a hot runner (not shown) that cooperates therewith. Alternatively for a modest decrease in length of the converted preform 400, such within the specified range, an alternative to the foregoing is to simply increase the length of the gate vestige 408 (FIG. 4) and thereby leave the location of the nozzle interface 531 unchanged and without modification of the hot runner.

It is noted that the foregoing has outlined some of the more pertinent non-limiting embodiments. It will be clear to those skilled in the art that modifications to the disclosed non-limiting embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. A method for converting a design of an original preform that is blow moldable to form a container into a design of a converted preform having less molding material that is blow moldable to form the same container, the original preform having a hollow tubular body that includes a neck finish at an open end thereof, an original base at a closed end thereof and a body arranged between the neck finish and the original base, wherein the neck finish is configured to retain, in use, a closure thereon, and the body and the original base are blow moldable to form corresponding parts of the container, the method comprising:

retaining the neck finish and the body of the original preform on the converted preform; and replacing the original base of the original preform with a converted base having an outer base surface that joins with an outer body surface of the body at a base split line (S1) of the original base and that fits offset within an original outer body surface of the original base, whereby the outer base surface of the converted base is entirely convex, and the converted preform has a reduced total length, disregarding any gate vestige that may be formed thereon, relative to a total length of the original preform.

2. The method of claim 1, wherein:
the outer base surface, disregarding any gate vestige that may be formed thereon, is defined to intersect with a longitudinal axis of the converted preform at a point that is offset by a distance of 0.05 to 0.25 mm from a further point where the original base, disregarding any gate vestige that may be formed thereon, intersects the longitudinal axis of the original preform.

3. The method of claim 1, wherein:
the replacing of the original base further includes maintaining an inner base surface thereof on the converted base that joins with an inner body surface of the body, whereby the converted base has a reduced bottom wall thickness relative to a bottom wall thickness of the original base.

4. The method of claim 3, wherein:
replacing the original base further includes defining the outer base surface of the converted base having compound surfaces of different curvature.

5. The method of claim 4, wherein:
the outer base surface of the converted base replaces a hemispherical outer base surface of the original base.

6. The method of claim 4, wherein:
the outer base surface has an elliptic paraboloid shape.

7. The method of claim 4, wherein:
the outer base surface joins to the outer body surface at an intersection or at a tangent.

8. The method of claim 4, wherein:
the outer base surface of the converted base is selected to define a thinnest bottom wall thickness along a central region thereof.

* * * * *

(12) EX PARTE REEXAMINATION CERTIFICATE (214th)
Ex Parte Reexamination Ordered under 35 U.S.C. 257

United States Patent
Beck

(10) Number: US 10,556,374 C1
(45) Certificate Issued: Jun. 22, 2022

(54) METHOD FOR CONVERTING A DESIGN OF AN ORIGINAL PREFORM AND A RELATED MOLD STACK FOR THE MOLDING THEREOF

(71) Applicant: Husky Injection Molding Systems Ltd., Bolton (CA)

(72) Inventor: Christophe Simon Pierre Beck, Terville (FR)

(73) Assignee: HUSKY INJECTION MOLDING SYSTEMS LTD., Bolton (CA)

Supplemental Examination Request:
No. 96/000,342, Sep. 16, 2020

Reexamination Certificate for:
Patent No.: 10,556,374
Issued: Feb. 11, 2020
Appl. No.: 15/527,485
PCT Filed: Nov. 4, 2015
PCT No.: PCT/CA2015/051132
§ 371 (c)(1),
(2) Date: May 17, 2017
PCT Pub. No.: WO2016/095020
PCT Pub. Date: Jun. 23, 2016

Related U.S. Application Data

(60) Provisional application No. 62/091,813, filed on Dec. 15, 2014.

(51) Int. Cl.
B29C 49/42 (2006.01)
B29C 45/27 (2006.01)
B29C 49/30 (2006.01)
B29B 11/08 (2006.01)
B29B 11/14 (2006.01)
B29C 45/26 (2006.01)
B29L 31/00 (2006.01)
B29C 45/17 (2006.01)

(52) U.S. Cl.
CPC .......... *B29C 49/4242* (2013.01); *B29B 11/08* (2013.01); *B29B 11/14* (2013.01); *B29C 45/2708* (2013.01); *B29C 45/2711* (2013.01); *B29C 49/30* (2013.01); *B29C 49/4289* (2013.01); *B29C 45/2673* (2013.01); *B29L 2031/7158* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,342, please refer to the USPTO's public Patent Application Information Retrieval (PAIR) system under the Display References tab.

*Primary Examiner* — Glenn K Dawson

(57) ABSTRACT

Disclosed herein, amongst other things, is a method for converting a design of an original preform that is blow moldable to form a container into a converted preform having less molding material that is blow moldable to form the same container. The method includes retaining a neck finish and body of the original preform on the converted preform. The method further includes replacing the original base of the original preform with a converted base having an outer base surface that joins with an outer body surface of the body at an base split-line of the original base and that fits offset within an outer body surface of the original base, whereby the converted preform has a reduced total length, disregarding any gate vestige that may be formed thereon, relative to a total length of the original preform.

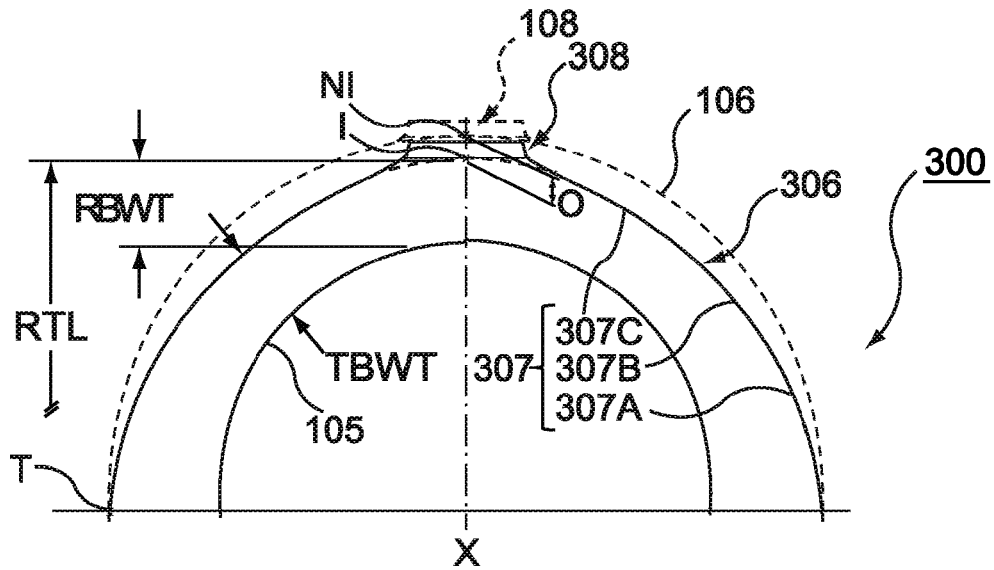

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-8 are cancelled.

* * * * *